United States Patent [19]

Liucci

[11] Patent Number: 5,311,014
[45] Date of Patent: May 10, 1994

[54] OPTICAL TRANSDUCER FOR MEASURING PRESSURE

[76] Inventor: Charles A. Liucci, 5 Burns Pl., Cresskill, N.J. 07626

[21] Appl. No.: 972,541

[22] Filed: Nov. 6, 1992

[51] Int. Cl.[5] .............................................. G01D 5/34
[52] U.S. Cl. .................................. 250/231.11; 73/705
[58] Field of Search ............ 250/231.1, 231.11, 231.19, 250/214 A; 73/31.04, 705, 718, 716, 730, 724, 728, 722

[56] References Cited

U.S. PATENT DOCUMENTS

| | | | |
|---|---|---|---|
| 2,443,427 | 6/1948 | Kidder et al. | 250/231.19 |
| 3,817,625 | 6/1974 | Jordan | 73/705 |
| 4,620,093 | 10/1986 | Barkhoudarian et al. | 250/231.19 |
| 4,667,097 | 5/1987 | Fasching et al. | 250/231.19 |

Primary Examiner—David C. Nelms
Assistant Examiner—K. Shami
Attorney, Agent, or Firm—Richard A. Joel

[57] ABSTRACT

Differential displacement is optically detected by independent movement of either a collimated light source or a dual element photosensitive detector. Relative movement between the detector or light source generates a signal proportional to the amount of light striking the photosensitive elements. This invention relates to improved devices for the transformation of physical forces into mechanical and electro-optical response, for measuring the forces involved, and, in particular for wet/wet liquid and gas differential, gage and absolute, pressure measurements.

15 Claims, 5 Drawing Sheets 5,311,014

1

OPTICAL TRANSDUCER FOR MEASURING PRESSURE

BACKGROUND

The detection of relative motion between mechanical members is used in many instruments. Measurement of physical forces within a system wherein electro-optical signals are generated, relative to position changes are in wide use. For example, diaphragms, bellows and bourdon tubes may be connected so that relative motion is developed when there are changes in the ambient pressure. Forces may be generated by weight, acceleration, temperature or other characteristics of the system.

The transduction of displaced motion into useful electrical data is widely used in many instrument applications. Previous systems have detected relative movement by the use of splitters, baffles and vanes between the light source and photosensitive detectors.

The present invention virtually eliminates previous system inaccuracies and lack of microsensitivity permits and easy adjustment. In the past, these systems have used only one photosensitive detector and no optical feedback. Therefore, these systems were subjected to electrical changes as a function of temperature, fatigue and optical drift. The symmetrical design of the pressure sensing elements and dual photosensitive detector, with optical feedback, eliminates the adverse effects of the prior art. Short and long term stability is achieved by a third photosensitive detector with electro-optical feedback from a light source into an electrically balanced circuit.

In order to obviate the aforementioned disadvantages of the prior art, the principle objects of this invention are to minimize inaccuracies, temperature and optical drift and to increase sensitivity and stability without internal adjustment, by use of symmetrical strut tube force sensing members and optical feedback for electro-optical stability.

SUMMARY

This invention relates to a differential displacement transducer for converting position into an electro optical signal proportional to relative displacement, between two sensing members by using a dual element photosensitive detector and a collimate light beam. Moreover, it is completely immune to inaccuracies that previously resulted from differences of temperature gradient in the moving members and fluctuations in temperature and voltage in manner of the prior art. Relative displacement of either the light source or photosensitive detector element produces the same proportional light upon one of the detectors and subtracts an equal amount from the other, thus always maintaining an electro-optical reversible network without any internal sensitivity adjustments as required in the prior art.

The foregoing is achieved by using an optical collimator, light radiation source and a pair of juxtaposed radiation detectors. Proportional signals emitted by each of photo-detectors corresponds to their surface areas which are exposed to the radiation. A third photosensitive detector orthogonal to the light source provides electrical input to an optical feedback circuit, for long term stability of radiation drift and effects of temperature and or voltage changes which adversely affect accuracy of similar transducers of the prior art. The circuit receiving signals from the dual element detectors includes a balance bridge, signal conditioner and amplifier which converts the received signal to a useful analogy output. The signal is indicative of the sensing members position. In that the sensing members are identical in configuration and material, the effects of temperature change are inherently eliminated. Improved accuracy is obtained from the strut-tube sensing members of preferred material having nearly zero thermoelastic coefficient such as Ni-Span-C alloy 902.

It is the object of this invention to provide a unique electro-optical transducer for converting differential position into a DC electrical output signal for monitoring and control purposes.

It is also an object of this invention to provide a transducer completely immune to long term drift, zero shift, and temperature and voltage errors which affect accuracy of the prior art devices.

It is also an object of this invention to effect a unique and economical method in which errors associated with prior art transducers are inherently eliminated. This is accomplished by the symmetrical strut-tube differential displacement and optical collimated beam sensing signals as a basis for force and pressure measurement.

BRIEF DESCRIPTIONS OF DRAWINGS

DETAILED DESCRIPTION OF THE DRAWINGS

Figure 1:
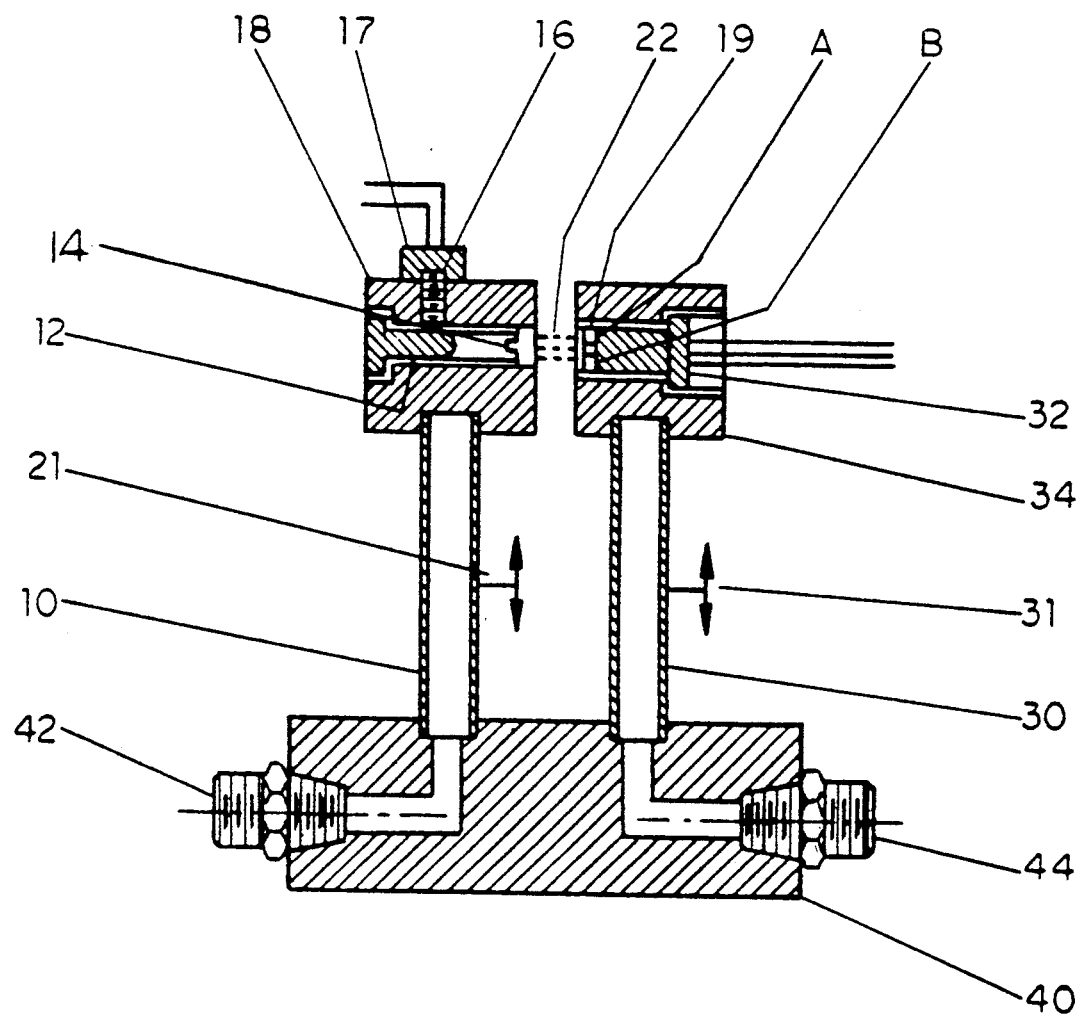
FIG. 1 is a schematic cross section illustration of a first embodiment of the invention.

FIG. 1 is a schematic drawing of a first embodiment of the end use employing the invention as a differential, gage and absolute pressure transducer. Referencing FIG. 1, the embodiment thereof is comprised of two identical strut sensing tube members 10 and 30. As previously discussed the sensing apparatus of this invention may be used in many ways in which the strut tubes 10, 30 respond to physical changes. One end of the tubes 10, 30 remains fixed to the housing 40, while the upper ends are free to move, bidirectionally 21 and 31, with the application of pressure or vacuum to ports 42 and 44. Expansion or contraction of the respective strut tubes 10 or 30, causes relative displacement and produces a positive output signal for expansion of tubes 10 or 30 and a negative output signal for contraction of tubes 10 or 30, by means of the electro-optics of FIG. 2.

Employing the invention for differential pressure measurement, attached to the top of collimator strut tube 10 is the collimator 14 and light source 12. As positive pressure is applied to port 42 with and reference pressure at port 44, the collimator tube expands and moves the collimator beam 22 up across sensitive area A of the dual element photo-sensor 32, thus producing a positive signal proportional to the differential displacement of tubes 10 and 30.

For a vacuum pressure applied to port 42 and reference pressure at port 44, the collimator beam 22 moves down across area B of the photo-sensitive dual element sensor 32, thus producing a negative voltage proportional to the differential displacement of tubes 10 and 30 relative to the input pressures. The exact same conditions exist for bidirectional pressure or vacuum applied to detector strut tube 30, to which is attached the dual element photo-sensor 32.

Employing the invention as a gage pressure transducer is exactly the same as a differential transducer, except the reference pressure is referred to ambient pressure.

Employing the invention as an absolute pressure transducer is exactly the same as the differential transducer, except the reference pressure is referred to vacuum pressure.

The uniform rectangular collimated light radiation field from emitter 12 is at peak sensitivity and wavelength effecting a match to photo-detector 32A and B. The differential position of the collimator or detector strut tubes directs the light radiation beam 22 onto a pattern of the dual sensor 32A and B of equal photo sensitive area. With both strut tubes 10 and 30 at zero displacement or equal displacement, the light striking the surface of detector 32A and B is equal, therefore the apparatus is at electro-optical null. For any differential displacement of strut tubes 10 or 30 of 0.2 micro-inches or greater the detector 32 intercepts the radiation energy which is subjected to the exposed changes in areas A and B of detector 32 and produces through its related circuitry an electrical output signal proportional to the said displacement.

The light from emitter 12 is also directed through the micrometer adjustment apparatus 16 onto a light sensitive feedback detector 17, which produces a feedback voltage proportional to any voltage change in emitter 12. The feedback detector 17 is also selected for peak response of the emitter 12. Preferred for these purposes are the commercially designed HEMT-3300 emitter from Hewlett Packard, the dual element detector VT301/2 or dual element silcon cell VTB5041 by EG&G Corporation and feedback detector TO-5 by Silcon Sensors Inc. The detectors may be of various types, they may be photoconductive or photoresistive using any conventional circuitry operably through a large temperature range.

In the embodiment using photoresistive detector elements the circuit operation is described with reference to FIG. 2.

Figure 2:
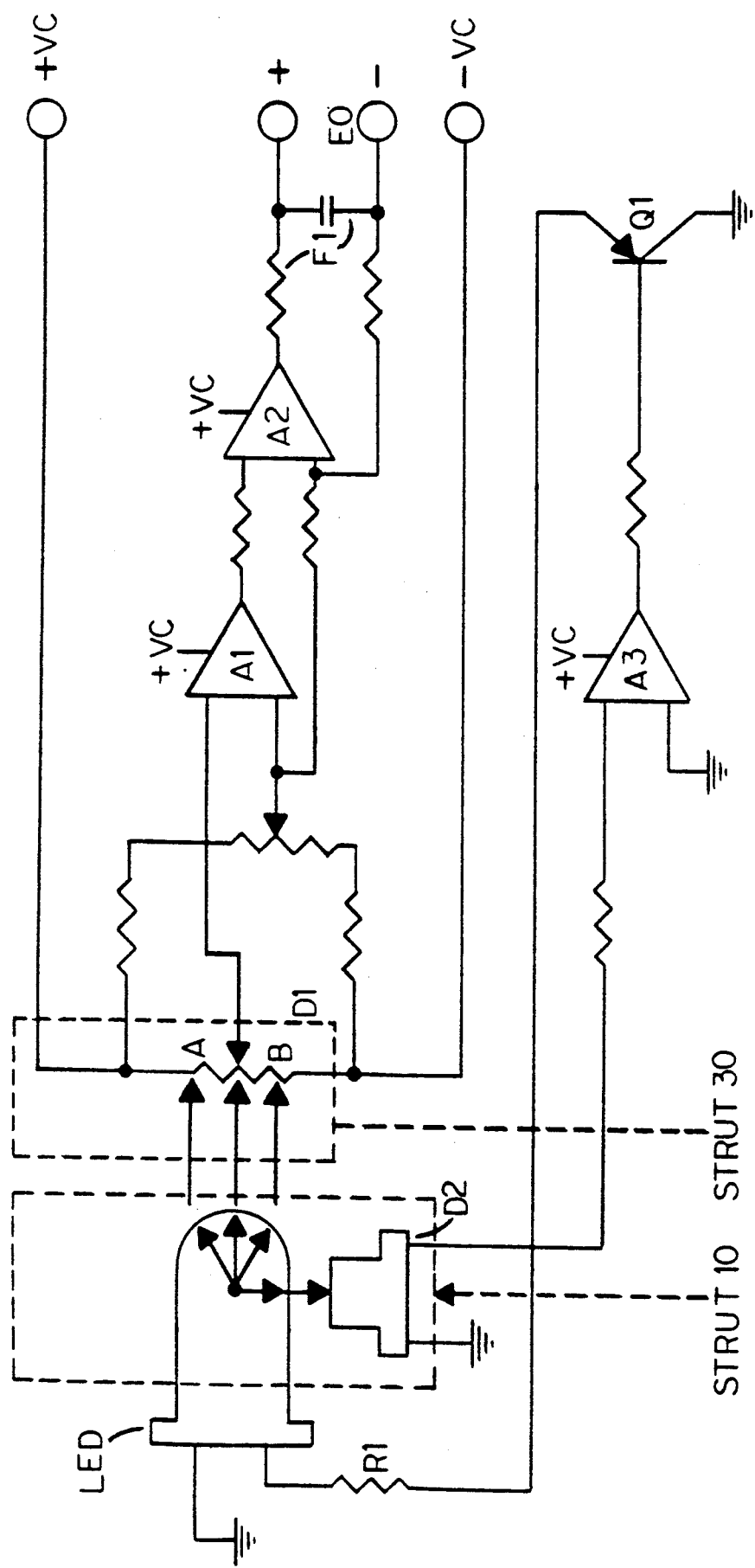
FIG. 2 is a schematic diagram of electro-optical output circuit for embodiment of FIG. 1.

Electronic operation per FIG. 2 is illustrated as a functional circuit diagram of the electronics associated with the herein defined transducer.

The basic operational principle of the electronics is to sense differential micro inch motion between detector D1 which is part of strut 30 and strut 10 to which the LED (light emitting diode) and detector D2 is attached. Electrical power, Vc is applied to all active electrical components which initiates the following. Amplifier A1 measures the optical radiant energy being coupled to detector D1 by the optical collimator link, in which the LED and detector D2 are housed. Referenced radiant energy from the LED is detected by D2 and amplified by A3 and fedback through Q1 to a current limiting resistor R1 and to the LED. The optical feedback maintains constant light radiation over the temperature range and for voltage fluctuations of Vc, thus providing long term stability of electro-optical signal to amplifier A1. The signal is further conditioned and amplifier by A2 and filtered at F1 for a DC voltage output, proportional and linear to displacement of struts 10 and 30.

Figure 3:
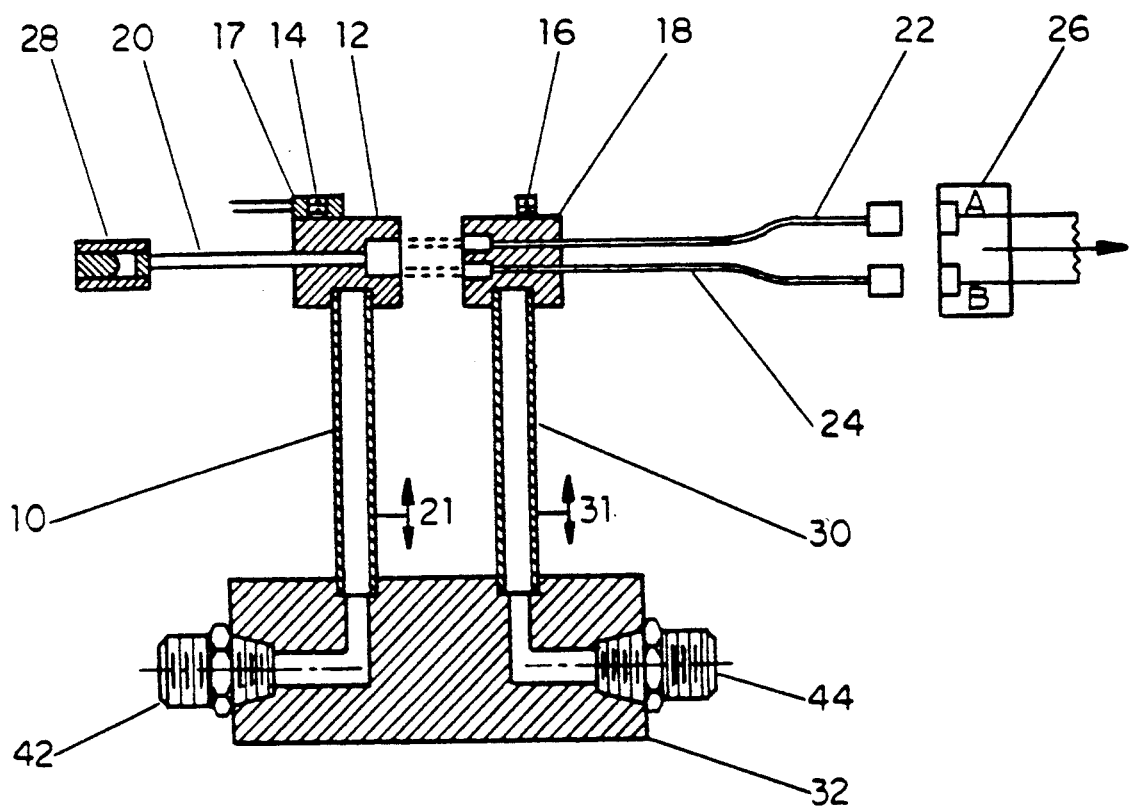
FIG. 3 is a schematic illustration of a second embodiment using fiber optic probers coupled to remote electronics of FIG. 2.

A second embodiment hereof utilizing fiber optic probes is described with reference to FIG. 3. This embodiment is exactly the same as the first except the light source 28 and dual element photodetector 26 are located remotely from the strut tubes 10 and 30 and interconnected by fiber optic bundles 20, 22 and 24. The fiberoptic housings 12 and 18 for light source 28 and detectors 26 employ a micrometer adjustment apparatus 14 and 16. The only difference in the fiber optic pressure transducer is the electro-optical pickoff of the relative displacement of strut tubes 10 and 30 and inherent wide operating temperature range of $-200°$ F. to $+1000°$ F. from the use of quartz fiber optics. The electronics circuitry is exactly as described in FIG. 2, for the first embodiment.

Figure 4:
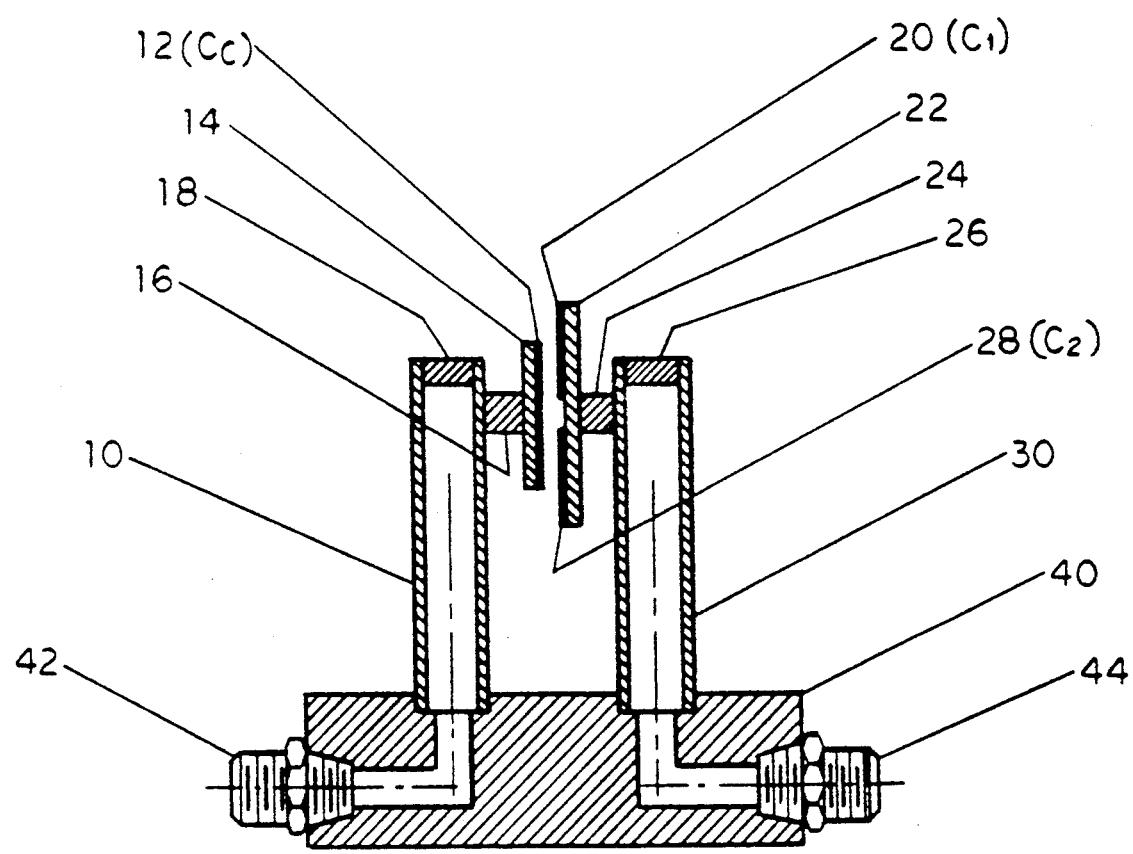
FIG. 4 is a schematic illustration of a third embodiment using differential capacitor plates with remote electronics shown in FIG. 4.

A third embodiment hereof utilizing a differential capacitor is described with reference to FIG. 4. This embodiment is exactly the same as in the first embodiment in its manner of sensing pressure by means of strut tubes 10 and 30. It differs only in the differential capacitive pickoff in place of the optics of the embodiments of FIGS. 1 and 2 and circuitry to develop a digital frequency output proportional to input pressure. The utilization of differential capacitors $C_c$ 12, $C_1$ 20 and $C_2$ 28 in independent oscillators will resonate at frequencies determined by $$f_n = \frac{1}{2\pi \sqrt{LC}},$$

where L is in Henry's, C in Farads and $f_n$ in hertz. The area of the capacitors is large compared to the separation, therefore, the differential capacity is determined by the transverse area covered by the differential movement of strut tubes 10 and 30. The capacitance change is determined by $$C = .225 \frac{kA}{d},$$

where k is dielectric constant, A equals area of capacitor plates in inches squared and d is plate separation in inches; C is given in picofarads. At zero differential pressure equal areas of $C_c$, 12 $C_1$, 20 and $C_2$, 28 will cause resonance of both oscillators at the same frequency. For any differential pressure change of strut tubes 10 or 30 the output of one oscillator will increase in frequency while the other will decrease relative to the pressure input.

Figure 5:
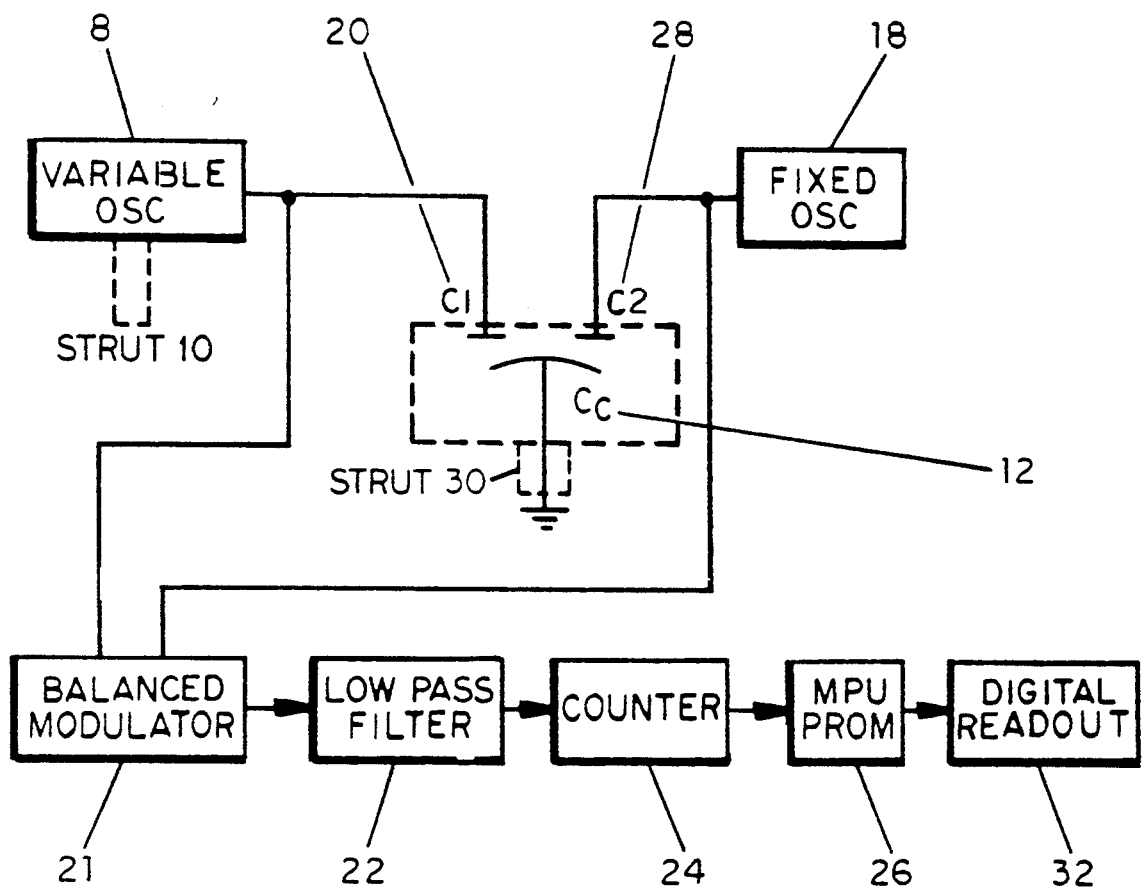
FIG. 5 is a schematic diagram of remote digital electronics for FIG. 4.

With reference to FIG. 5 the two frequencies are conditioned as inputs to a balanced modulator 21, the balanced mixer provides high isolation between inputs and is DC coupled. This provides frequency response from zero to a higher frequency. The output mixer 21 provides a difference of two frequencies, $F_1-F_2$ which is used to determine the $\Delta C$ from the capacitive pickoff as a result of input pressure. The output balanced modulator 21 is passed into a low pass filter 22, the frequencies $F_1-F_2$ are conditioned and fed to frequency counter 24. The counter output is a digital signal compatible with a micro-processor 26, from which the digital output 32 is directly related to the differential input pressure to strut 10 or 30. Differential, absolute and gage pressure can be accommodated with this electronic circuitry for a digital output.

The invention has been described herein before with respect to several preferred embodiments, it can have various changes and modification, without departing from the scope of this invention, and thus it is not intended to limit the invention, which has an endless variety of uses of which only several are identified.

It is intended that all drawings and specifications shall be illustrative and not limiting this embodiment. The transducer invention is an exclusive property of the following claims as defined as follows.

What is claimed is:

1. A differential position apparatus for detecting relative motion of a pair of movable member comprising:
   (a) a radiation collimator having an aperture, said collimator being attached to one of the relative moveable members, means directing a rectangular beam of light through the collimator apertures,
   (b) a pair of photosensitive radiation detectors with sensitive active areas producing an electrical signal proportional to the exposed radiation attached to the other of the relative moveable members, said light sensitive detectors or the collimated light beam being capable or intercepting the differential position of the light beam by perpendicular motion of either moving member bidirectional to where the radiation emitter and dectectors are attached, the relative movement between either changing the light striking one detector element and the light striking the other detector element, wherein said collimator beam is being supported for bidirectional longitudinal micrometer adjustment along an axis perpendicular to the beam to permit sensitive adjustment of the apparatus and means are provided for securely holding the collimator body in any adjusted position,
   (c) an optical feedback light sensitive detector located in the path of the said beam radiation pattern, sensitive to any quantum radiation fluctuation correlated to the ratio of measured to referenced radiation thereof, and,
   (d) means for changing the differential area between the radiation upon one light sensitive element by producing relative movement of other light sensitive area thus forming an optical bias and circuit means for producing a signal indicative of said differential bias.

2. Apparatus according to claim 1 wherein: the beam has a uniform radiation intensity through its transverse range of operation, and adjustment means permitting variations in sensitivity of the apparatus, said means of adjustment varying the position of the aperture.

3. Apparatus according to claim 2 wherein: the dual element photosensitive detector with the radiation path projects onto both elements, within its operating range.

4. Apparatus according to claim 2 wherein:
   (a) said collimator prevents optical backscarting and reflection of radiation at the aperture of said collimator.

5. Apparatus according to claim 1 wherein:
   (a) the source of radiation from the optical light source is diverted from the radiation pattern to the optical feedback detector producing an electrical signal which correlates to the ratio of measured differential to referenced input thereto.

6. Apparatus according to claim 1 wherein:
   (a) the optical light emitter and dual element detector are equal distant from the center line of said collimator and detector holder, and wherein either moveable member comprises a stout tube movable transversely and bidirectionally through an operating range in said radiation path to expose varying surface area of said elements and vary said correlated signals therefrom.

7. Apparatus according to claim 6 wherein:
   (a) the moveable members and element housing are identical and are of essentially zero thermoelastic material requiring no mechanical or electrical compensation thereof.

8. Condition responsive apparatus comprising in combination:
   (a) a radiation collimator projecting a path of light condition responsive strut tube operative to initiate differential movement in response to condition changes to which it is sensitive and an optical radiation source attached thereto, adjustable for high or low sensitivity projected into the collimator light,
   a condition responsive apparatus strut tube operative to initiate differential movement in response to condition changes to which it is sensitive, and a dual photo-sensitive element mounted thereto with predetermined active areas, each element emitting in combination and electrical analog signal continuosly correlated to its relative active area exposed to the radiation,
   a condition responsive apparatus in which said collimator is moveable through its operating range within a portion of the radiation path projected toward one of said photo-sensitive elements in said detector tube and said means includes a circuit for sensitivity, null and gain adjustments indicative of differential movement of the collimator strut tube member and reference strut tube,
   Condition responsive apparatus in which said strut tube detector is moveable throughout its operating range within a portion of the radiation path projected toward other photo-sensitive element in said detector tube, with circuit to produce electrical signal indicative of differential movement of the detector tube member and reference tube,
   wherein said both moveable member strut tubes, said source and said element are transversely moveable bidirectionally by said conditions responsive through a differential operating range in said radiation path for relatively varying exposed areas of said elements and said correlated signal therefrom and analog circuit means operable to correlate signals from each of said elements to which radiations at any given position through range of said relative tube displacement under different applied forces.

9. Apparatus for sensing differential pressure according to claim 8 wherein:
   movement of one or both strut members in response to changes in differential pressure changes the differential between light striking the dual photo-sensitive element and circuit means for producing an electrical signal proportional to said differential.

10. Apparatus for sensing gage pressure according to claim 9 comprising: means operative of one strut tube in response to a pressure change and the other strut tube acting as reference to produce differential light striking the dual photosensitive element by means of an electrical signal correlated to the measured gage pressure.

11. Apparatus for sensing absolute pressure according to claim 9 Comprising: means for evacuation of one strut tube in response to a change absolute pressure in second tube to produce a differential displacement proportional to light striking the dual element photo-sensitive detectors causing an electrical signal correlated to the measured absolute pressure.

12. Apparatus according to claim 9 wherein:
the moveable strut members are dead ended sensing tubes, and suited for wet/wet pressure measurements of liquid, gas and slury, thereof in combination with control systems, open or closed loop, thereof.

13. A further second embodiment of the invention comprising a position sensing pickoff apparatus according to claim 8: wherein said condition responsive means comprises two fiber optic probes attached to said strut tubes and a remote electrical means coupled thereto for producing an signal indicative of the differential forces applied.

14. A further third embodiment of the invention comprising a position sensing pickoff apparatus according to claim 8: wherein said condition response means comprises two differential capacitive plates attached to said strut tubes including remote electronics, and mean for producing a digital signal indicative of the differential forces applied.

15. Transducer apparatus comprising two identical strut tubes of substantially zero thermoedastic coefficient alloy material which undergoes increase or decrease differentially in length as a function of applied force which is detected by photo optical means and provides an electrical output with a simple sensitivity adjustment.

* * * * *